UNITED STATES PATENT OFFICE.

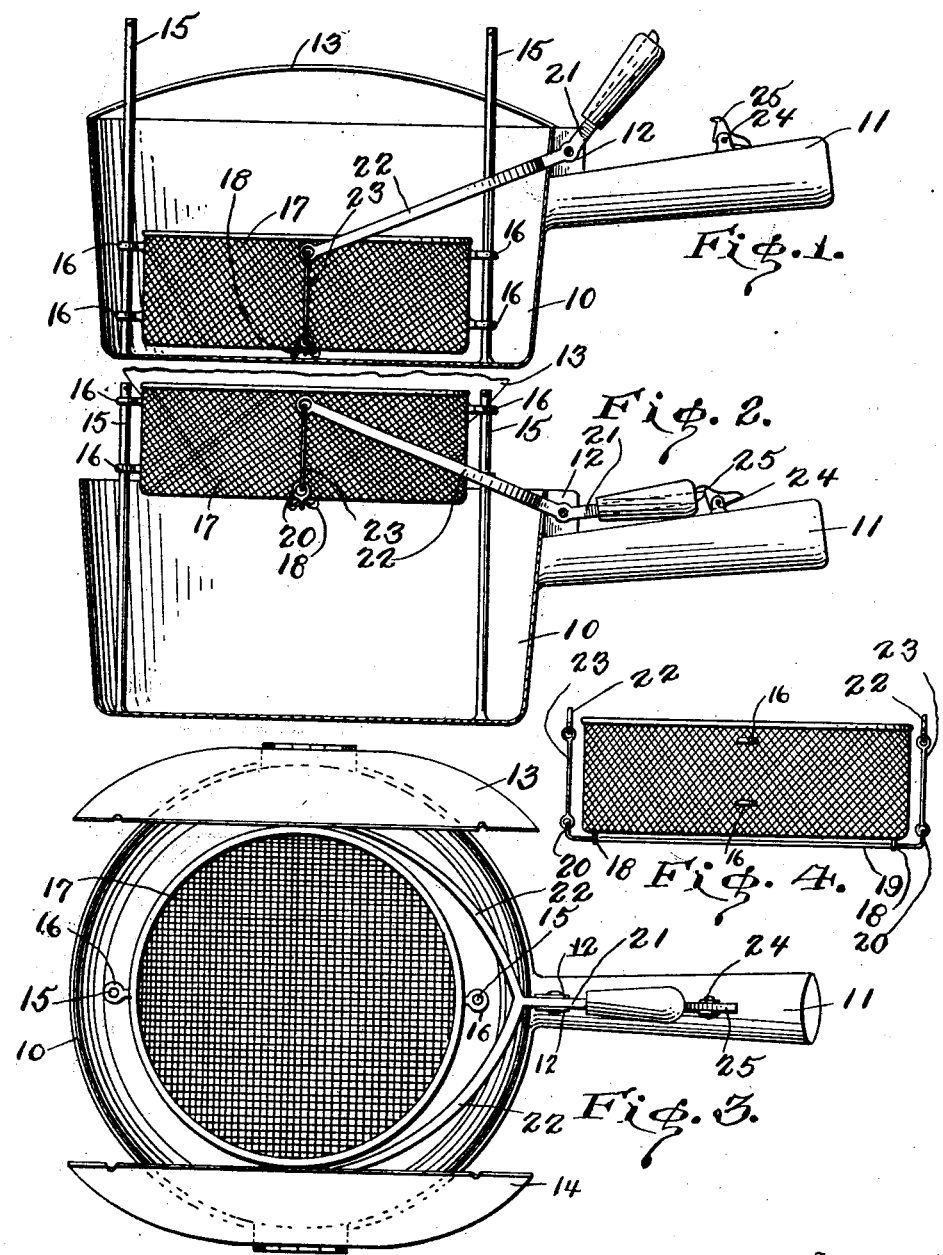

AUSTIN A. OVERBURY, OF NEWARK, NEW JERSEY.

EGG-BOILING UTENSIL.

1,198,374.  Specification of Letters Patent.  Patented Sept. 12, 1916.

Application filed July 16, 1915. Serial No. 40,288.

*To all whom it may concern:*

Be it known that I, AUSTIN A. OVERBURY, a citizen of the United States, residing at Newark, in the county of Essex, State of New Jersey, have invented certain new and useful Improvements in Egg-Boiling Utensils; and I do hereby declare the following to be a full, clear, and exact description of the invention, such as will enable others skilled in the art to which it appertains to make and use the same.

This invention relates to egg boiling utensils.

The object of the invention is to provide a utensil of the character named embodying an improved construction whereby eggs to be boiled can be easily inserted in and removed from the boiling water without danger of breaking same and without danger of injuring the hands.

A further object of the invention is to provide a utensil of the character named through the instrumentality of which the eggs after being boiled can be suspended over the boiling water and kept warm until desired for use.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which:—

Figure 1 is a longitudinal section of a utensil constructed in accordance with the invention and with the parts in normal position; Fig. 2, a view similar to Fig. 1 with the egg holding basket in elevated position; Fig. 3, a plan view of what is shown in Fig. 2, and Fig. 4, a view of the basket taken at right angles to what is shown in Fig. 1.

Referring to the drawings the utensil is shown as comprising a body 10 in the form of a receptacle and including a handle 11 having formed on the inner end thereof spaced ears 12. The top of the receptacle or body 10 is adapted to be closed by hinged lid sections 13 and 14, the hinges being of the spring type and normally holding the sections closed. Rising from the bottom of the receptacle 10 are spaced guides 15 and slidably mounted on these guides through the medium of eyes 16 is a perforated egg holding basket 17. Secured to the bottom of this basket at diametrically opposite points are socket members 18 in which is seated a lifting bar 19 having its ends terminating in upwardly directed eyes 20. Pivotally mounted between the ears 12 is a lever 21 one end of which is forked to form arms 22 and the free ends of these arms are connected by links 23 with the eyes 20 at the ends of the bar 19. By this construction it may be obvious that by oscillating the lever 21 from the position shown in Fig. 1 to the position shown in Fig. 2 the basket 17 will be elevated out of the receptacle 10 and during this upward movement of the basket the lid sections 13 and 14 will be automatically raised. To provide means for securing the basket in elevated position there is pivoted between ears 24 on the handle 11 a latch 25 adapted to engage over the adjacent end of the lever 21.

In the use of the device the basket 17 is lowered and the water in the receptacle 10 heated until it reaches the boiling point. The basket is then raised by pushing down lever 21 until it engages the latch 25. The eggs are then placed in the basket 17 and the latter is lowered into the receptacle. After the eggs are done the basket is again elevated and the eggs removed or they can be left in the basket over the boiling water to be maintained warm until desired.

What is claimed is:—

1. A utensil of the class described comprising a receptacle body, closure sections oppositely hinged to the body at the upper portion thereof for movement downwardly into closed position and upwardly into open position, spaced uprights rising from the bottom of the body and extending above the top thereof, a perforated basket slidably mounted upon the uprights for vertical movement, a lever pivotally connected with the body, link connections between the lever and the basket for movement of the basket upon the uprights when the lever is moved, releasable means for holding the lever with the basket above the body, and yieldable means for holding the closure sections in closed position, said sections, when in closed position, lying in the path of movement of the basket for engagement by the basket and for movement thereby into open position.

2. A utensil of the class described comprising a receptacle body, spaced uprights rising from the bottom of the body and extending above the top thereof, a perforated basket slidably mounted on the uprights, a lifting bar disposed beneath the basket, a handle on the body, a lever pivoted on the handle and having a forked terminal forming arms, links connecting the free ends of said arms to respective ends of the lifting bar, and a latch carried by the handle for detachably engaging the lever to secure the basket in elevated position.

In testimony whereof, I affix my signature, in the presence of two witnesses.

AUSTIN A. OVERBURY. [L. S.]

Witnesses:
GEO. LAYER. [L. S.]
ANNA T. MCMANIS. [L. S.]

Copies of this patent may be obtained for five cents each, by addressing the "Commissioner of Patents, Washington, D. C."